(12) United States Patent
Sullivan et al.

(10) Patent No.: US 10,354,395 B2
(45) Date of Patent: *Jul. 16, 2019

(54) METHODS AND APPARATUS TO IMPROVE DETECTION AND FALSE ALARM RATE OVER IMAGE SEGMENTATION

(71) Applicant: The Nielsen Company (US), LLC, New York, NY (US)

(72) Inventors: Jonathan Sullivan, Natick, MA (US); Brian Schiller, St. Louis, MO (US); Alejandro Terrazas, Santa Cruz, CA (US); Wei Xie, Woodridge, IL (US); Michael Allen Bivins, San Francisco, CA (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,887

(22) Filed: May 31, 2017

(65) Prior Publication Data

US 2017/0270676 A1 Sep. 21, 2017

Related U.S. Application Data

(63) Continuation of application No. 14/810,989, filed on Jul. 28, 2015, now Pat. No. 9,704,260.

(51) Int. Cl.
*G06T 7/231* (2017.01)
*G06T 7/12* (2017.01)
(Continued)

(52) U.S. Cl.
CPC ............ *G06T 7/231* (2017.01); *G06T 7/12* (2017.01); *G06T 7/143* (2017.01); *G06T 7/74* (2017.01); *G06T 2207/30242* (2013.01)

(58) Field of Classification Search
CPC ............ G06T 7/0083; G06T 7/0087; G06T 2207/30242; G06T 2207/10016; G06T 7/0085; G06T 5/001; G06K 9/48
(Continued)

(56) References Cited

U.S. PATENT DOCUMENTS 5,930,771 A 7/1999 Stapp
6,173,295 B1 1/2001 Goertz et al.
(Continued)

OTHER PUBLICATIONS

United States Patent and Trademark Office, "Non-final Office Action," issued in connection with U.S. Appl. No. 14/810,989, dated Sep. 23, 2016, 10 pages.
(Continued)

*Primary Examiner* — Sheela C Chawan
(74) *Attorney, Agent, or Firm* — Hanley, Flight & Zimmerman, LLC

(57) ABSTRACT

Methods and apparatus to improve detection and false alarm rate over image segmentation are disclosed. An example method includes determining a first score based on a first pixel distance between a first feature of a first object in a reference image and a second feature in a second image of a search area, determining a second score corresponding to a second pixel distance between the second feature and a mathematical representation of a plurality of shapes representing a similarity between the second feature in the second image of the search area and the plurality of shapes observed simultaneously. The method further includes determining a normalized score by normalizing the first score based on the second score and identifying a second object in the second image of the search area as the first object in the reference image when the normalized score satisfies a threshold score.

18 Claims, 8 Drawing Sheets

(51) Int. Cl.
*G06T 7/143* (2017.01)
*G06T 7/73* (2017.01)

(58) Field of Classification Search
USPC ....... 382/199, 224, 106, 108, 168, 173, 170,
382/175, 174, 181, 192, 203, 278, 312,
382/100; 700/218
See application file for complete search history.

(56) References Cited

U.S. PATENT DOCUMENTS

| | | |
|---|---|---|
| 7,693,757 B2 | 4/2010 | Zimmerman |
| 7,949,568 B2 | 5/2011 | Fano et al. |
| 8,091,782 B2 | 1/2012 | Cato et al. |
| 8,175,925 B1 | 5/2012 | Rouaix |
| 8,380,347 B2 | 2/2013 | Garson et al. |
| 9,269,022 B2 * | 2/2016 | Rhoads ............... G06K 9/00208 |
| 9,704,260 B2 * | 7/2017 | Sullivan .................. G06T 7/143 |
| 2003/0154141 A1 | 8/2003 | Capazario et al. |
| 2008/0103939 A1 | 5/2008 | Gibb |
| 2009/0072029 A1 | 3/2009 | Martin |
| 2017/0032534 A1 | 2/2017 | Sullivan et al. |

OTHER PUBLICATIONS

United States Patent and Trademark Office, "Notice of Allowance" issued in connection with U.S. Appl. No. 14/810,989, dated Mar. 1, 2017, 10 pages.

* cited by examiner

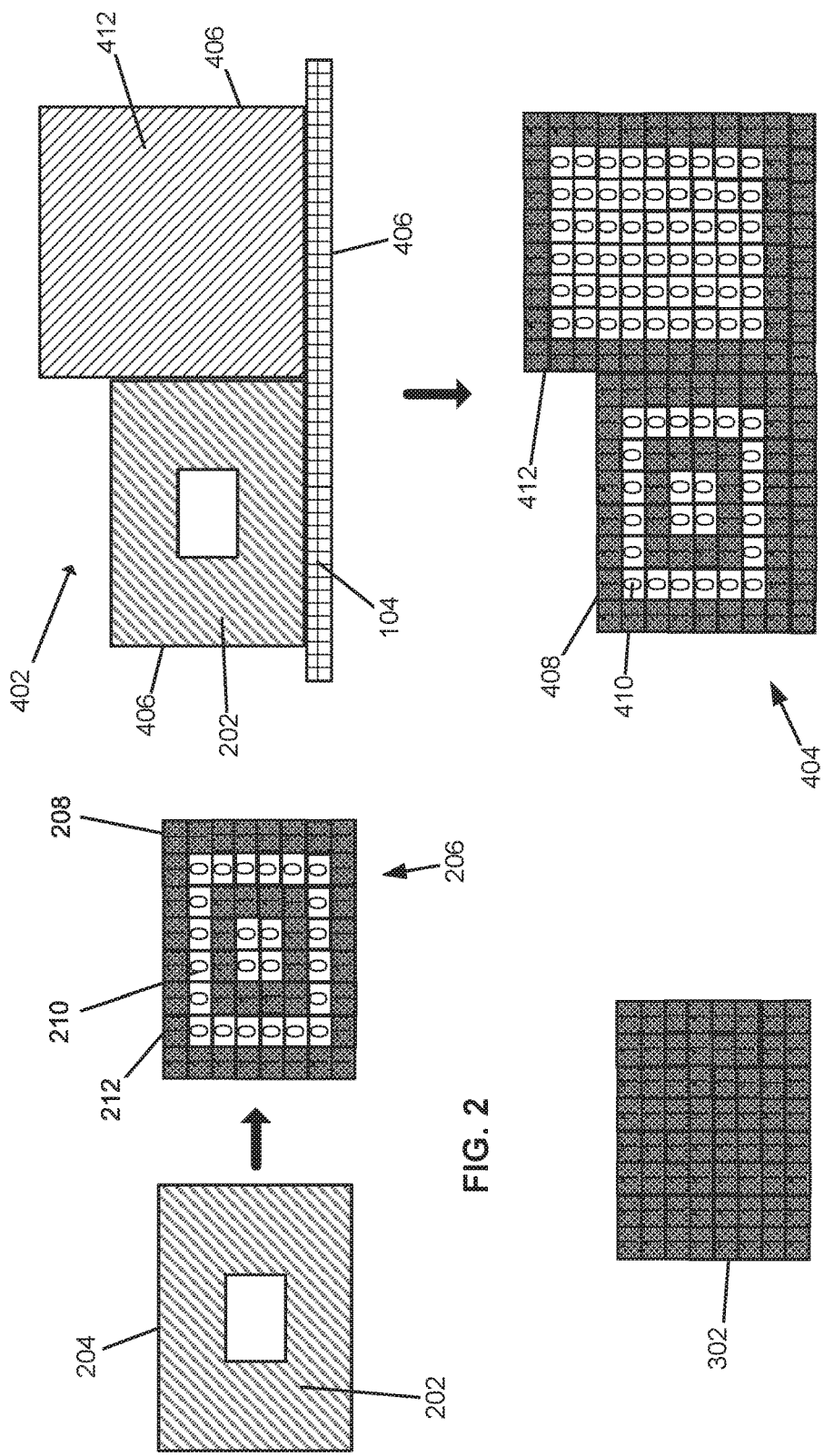

METHODS AND APPARATUS TO IMPROVE DETECTION AND FALSE ALARM RATE OVER IMAGE SEGMENTATION

CROSS REFERENCE TO RELATED APPLICATIONS

This patent arises from a continuation of U.S. patent application Ser. No. 14/810,989, filed Jul. 28, 2015, now U.S. Pat. No. 9,704,260. U.S. patent application Ser. No. 14/810,989 is hereby incorporated herein by reference in its entirety.

FIELD OF THE DISCLOSURE

This disclosure relates generally to object detection, and, more particularly, to methods and apparatus to improve detection and false alarm rate over image segmentation.

BACKGROUND

Retail store displays and shelves are stocked with various products. Products near the front of a shelf or display are known as facings. The goal for Consumer Packaged Goods (CPG) manufacturers to measure the number of facing of their products.

BRIEF DESCRIPTION OF THE DRAWINGS

FIG. 2 is a graphic representative of an example object of FIG. 1 and its edges.

FIG. 3 is an example matrix of ones representing a plurality of shapes observed simultaneously.

FIG. 4 is a graphic representative of an example search area and its associated edges.

DETAILED DESCRIPTION

Figure 1:
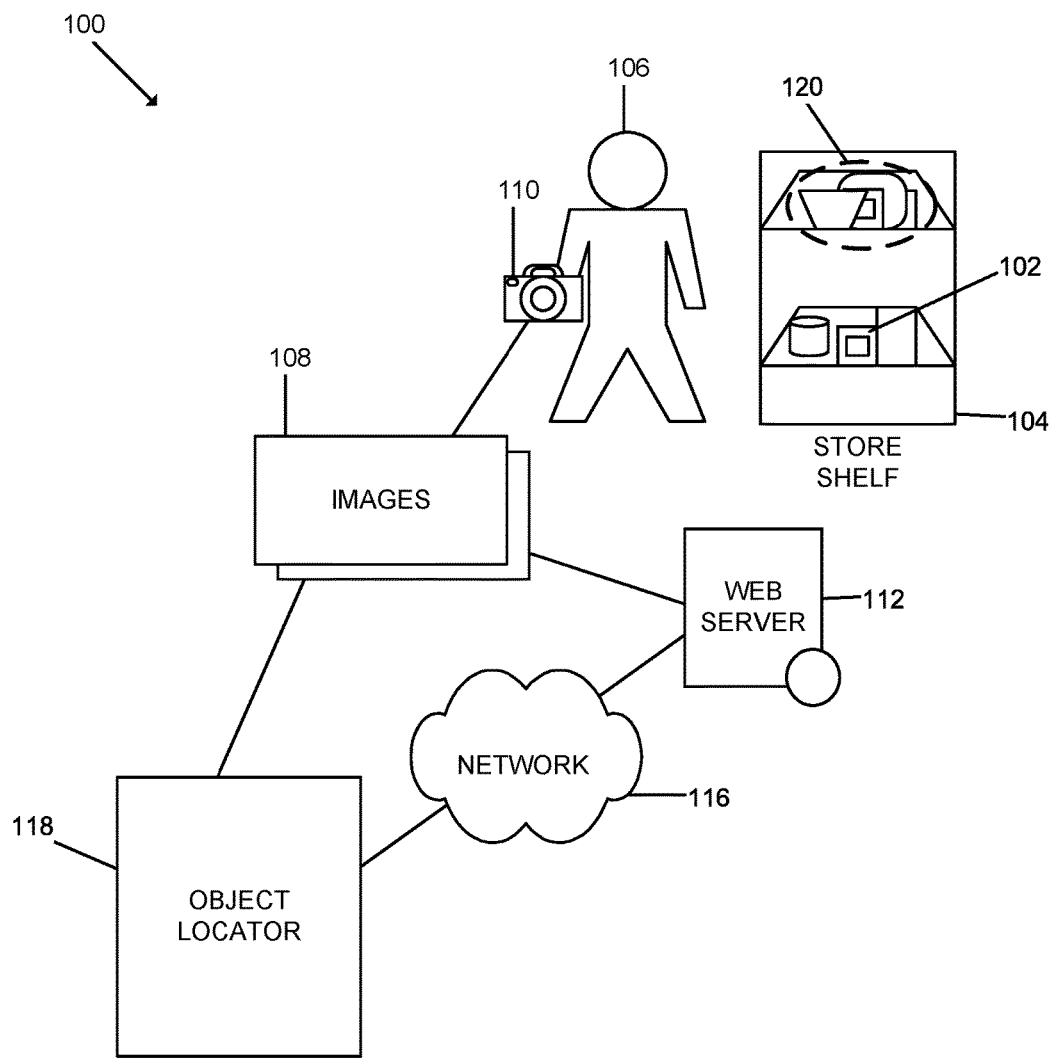
FIG. 1 is an example system for detecting objects as disclosed herein.

Example methods, systems, and/or articles of manufacture disclosed herein enable detection of an object in an image by improving a chamfer matching process.

Examples disclosed herein improve object detection and false detection rate over image segmentation. For example, Nielsen Store Observation (NSO) measures a number of products facing a shopper, also known as facings. In some examples, edge detection methods are used to detect objects in an image. For example, an object of interest is searched for in an image of a retail shelf by utilizing image processing techniques, such as chamfer matching. Chamfer matching utilizes distance transforms to facilitate shape-based object detection. While the chamfer matching process enables detection of objects in an image, areas of high clutter in an image tend to create false detections of the object of interest. A false detection occurs when the object of interest is incorrectly detected in an image when in reality, the object of interest is absent from the image. By normalizing the chamfer matching process based on how a random object is detected in the image, examples disclosed herein may be used to improve object detection and false detection rates.

Example methods are disclosed herein to detect an object in an image. In some examples, a first image and a second image are retrieved. In some examples, a first score is determined based on a first chamfer distance between first edges of a first object in the first image and second edges in the second image. In some examples, a second score corresponding to a second chamfer distance between the second edges and a mathematical representation of a plurality of shapes is determined. In some such examples, the second score represents a similarity between the second edges and the plurality of shapes observed simultaneously. In some examples, a normalized score is determined by normalizing the first score based on the second score. In some examples, a presence of a second object in the second image matching the first object is detected when the normalized score satisfies a threshold score. In some examples, the second score represents a lesser similarity between the second edges and the plurality of shapes observed simultaneously than a second similarity between the second edges and any one of the plurality of shapes. In some examples, the plurality of shapes corresponding to the mathematical representation are representative of background clutter. In some examples, the second edges of the second image are edges of a retail store shelf. In some examples, determining the second score further comprises cross-correlating the second edges with a matrix of ones having the same size as the first object. In some examples, the first chamfer distance is a measure of pixel distances between portions of the first edges and the second edges. In some examples, the second chamfer distance is a measure of pixel distances between the second edges and the mathematical representation of the plurality of shapes.

Example apparatus to detect an object in an image disclosed herein include an image storage, an object storage, an image retriever, an edge detector, a distance calculator, an image scorer, a normalizer, a matrix generator, and an object detector. In some examples, the image retriever retrieves a first image and a second image. In some examples, the image scorer determines a first score based on a first chamfer distance between first edges of a first object in the first image and second edges in the second image. In some examples, the image scorer determines a second score corresponding to a second chamfer distance between the second edges and a mathematical representation of a plurality of shapes, the second score representing a similarity between the second edges and the plurality of shapes observed simultaneously. In some examples, the normalizer determines a normalized score by normalizing the first score based on the second score. In some examples, the object detector detects a second object in the second image matching the first object when the normalized score satisfies a threshold score.

Disclosed herein, example articles of manufacture comprise instructions that, when executed, cause a computing device to at least retrieve a first image and a second image. In some examples, the instructions further cause the computing device to determine a first score based on a first chamfer distance between first edges of a first object in the first image and second edges in the second image. In some examples, the instructions further cause the computing device to determine a second score corresponding to a second chamfer distance between the second edges and a mathematical representation of a plurality of shapes, the second score representing a similarity between the second edges and the plurality of shapes observed simultaneously. In some examples, the instructions further cause the computing device to detect a second object in the second image matching the first object when the normalized score satisfies a threshold score.

Turning to the figures, FIG. 1 shows an example system 100 to detect objects of interest, such as a product 102, in an area of interest, such as a store shelf 104. In retail stores, a status of the store shelf 104, such as a number of products facing the shopper, is monitored to ensure the store shelf 104 is stocked properly. For example, store shelves may be stocked according to a planogram diagram that illustrates a location and a quantity of specific products to be placed on the retail shelf. The product 102 may be a consumer packaged good that requires frequent replacement to keep the store shelf 104 stocked. Depleted stock on the store shelf 104 may result in a loss of sales of the product 102. Additionally, the appearance and organization of the product 102 on the store shelf 104 may affect consumer choices. If the product 102 is pushed too far back on the store shelf 104, the product 102 may be missed by a consumer and/or may negatively affect consumer perceptions and result in lost sales.

In the illustrated example, an auditor 106 takes images 108 of the store shelf 104 with a camera 110. In some examples, the camera 110 is a digital picture camera that captures and stores images 108 on an internal memory and/or a removable memory. In some examples, the images 108 of the store shelf 104 are captured sequentially at an interval of time. For example, the images 108 may capture the same store shelf 104 every four hours to monitor movement of the product 102 on the shelf 104.

In the illustrated example, the images 108 are uploaded to a web server 112 via the network 116, such as the Internet, to be retrieved by the object locator 118 and/or sent directly to an object locator 118. In some examples, the object locator 118 obtains the images 108 from the internal memory and/or the removable memory of the camera 110. In the illustrated example, the object locator 118 retrieves the images 108 from the web server 112 via the Internet 116 and/or internal memory and/or the removable memory of the camera 110 to detect and/or count objects on the store shelf 104. In some examples, the images 108 are stored directly on the object locator 118.

In some examples, the store shelf 104 may carry a plurality of different products which may result in an area of clutter 120 on the store shelf 104. The areas of clutter 120 can create challenges in processing the images 108 to detect the product 102 by creating false detections of the product 102 in the areas of clutter 120. Examples disclosed herein improve detection of objects by minimizing false detections of the objects in the areas of clutter 120.

FIG. 2 illustrates an example object 202 having edges 204 and a binary representation 206 representing the edges 204 of the object 202. In the illustrated example, the example object 202 corresponds to the product 102 on the store shelf 104 represented in FIG. 1. In the illustrated example, the binary representation 206 is a simplified graphic representation of the edges 204 of the object 202 and is not to scale with the object 202. As such, the blocks of the binary representations of FIGS. 2, 3, and 4 containing ones 208 (shown as shaded) and zeros 210 are enlarged for readability. In the illustrated example, the ones 208 correspond to pixels at the edges 204 of the object which are detectable by an edge detection process. In the illustrated example, the object 202 is a square object with a square hole in the middle, which is reflected in the binary representation 206 by the ones 208 along the perimeter of the binary representation 206 and the zeros 210 surrounded by the ones 208 in the middle of the binary representation 206. In the illustrated example, the ones 208 form edges 212 of the binary representation 206. In some examples, the object 202 may be any other shape that includes a plurality of edges 204. The binary representations 204 and 404 are example representations of the edges 204 of the object 202 and the edges 406 of search area 402, other representations of the edges 204, 406 are possible.

FIG. 3 illustrates a matrix of ones 302 that represents a plurality of shapes observed simultaneously. In the illustrated example, the matrix of ones 302 is a mathematical representation of the plurality of shapes. In the illustrated example, the matrix of ones 302 represents an arbitrary object having edge pixels everywhere in the arbitrary object. In the illustrated example, the matrix of ones 302 has the same dimensions as the object 202. As such, the matrix of ones 302 corresponds to a variation of the object 202 having edge pixels everywhere in the object 202. In some examples, the dimensions of the matrix of ones 302 vary based on the size of the object 202. For example, a larger object 202 has a larger corresponding matrix of ones 302, while a smaller object 202 has a smaller corresponding matrix of ones 302. In some examples, the plurality of shapes are representative of background clutter in the image 108 and/or the area of clutter 120.

FIG. 4 illustrates an example search area 402, such as may be on or including a store shelf, and a binary representation 404 that represents edges 406 of objects found in the search area 402. In the illustrated example, the edges 406 of the search area 402 are represented by a binary matrix including ones 408 (shown as shaded) and zeros 410. The ones 408 represent pixels at the edges 406 of the search area 402 which are detectable by an edge detection process. In the illustrated example, the ones 408 form edges 412 of the binary representation 404. In the illustrated example, the search area 402 includes a portion of the store shelf 104, the object 202, and another object 412 on the store shelf 104. In the illustrated example, the binary representation 404 includes the ones 408 and the zeros 410 arranged to reflect the search area 402. In some examples, the search area 402 does not contain the object 202.

Figure 5:
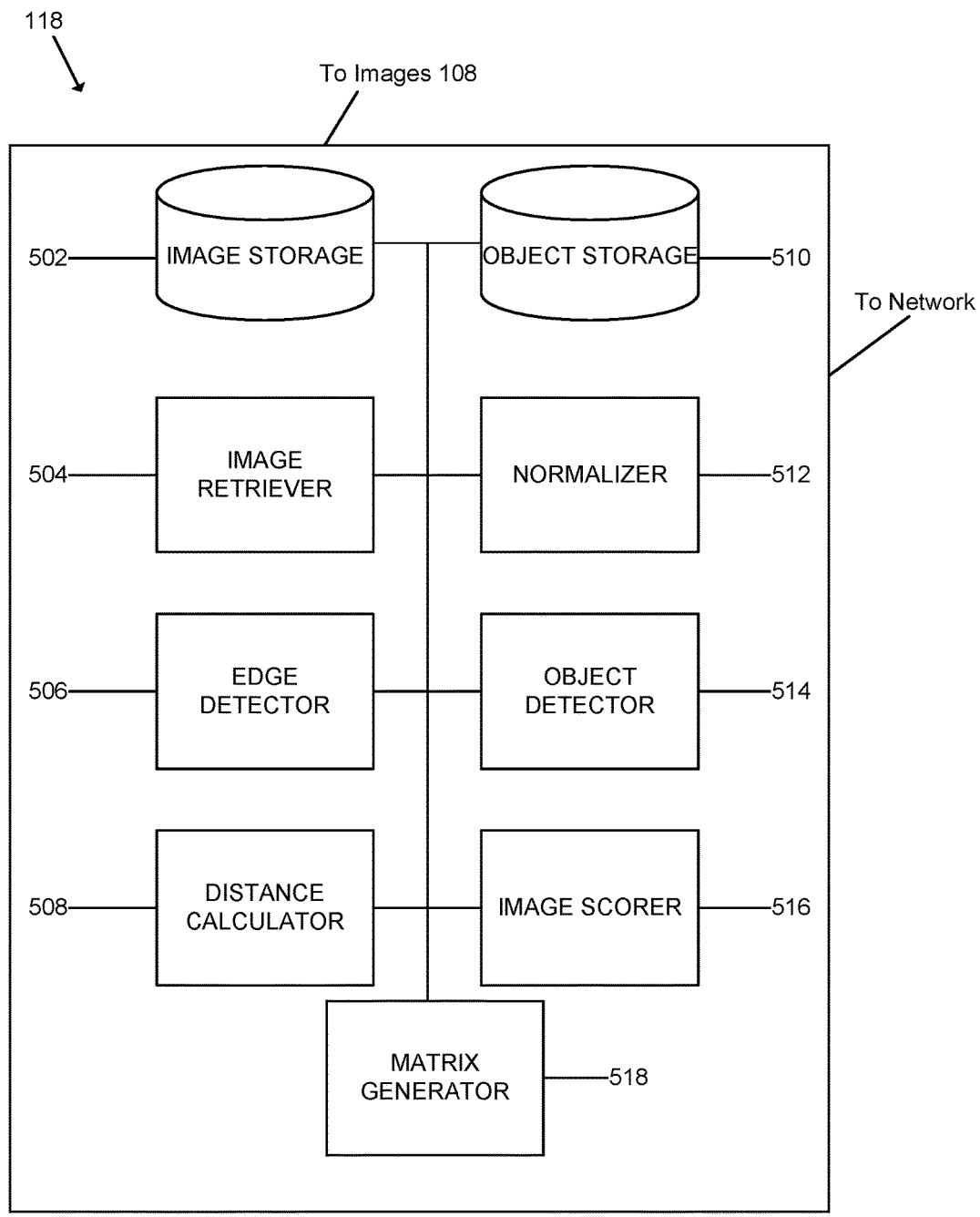
FIG. 5 is an example object locator of the system of FIG. 1 to locate objects in the example search area of FIG. 4.

FIG. 5 is a block diagram of an example of the object locator 118 that may be used to implement the system 100 of FIG. 1. In the illustrated example, the object locator 118 includes an image storage 502, an image retriever 504, an edge detector 506, a distance calculator 508, an object storage 510, a normalizer 512, an object detector 514, an image scorer 516, and a matrix generator 518.

In the illustrated example, the object locator 118 is provided with the image storage 502 to store images 108 of areas of interest, for example, the store shelf 104 and/or the search area 402. In some examples, the images 108 of areas of interest and/or objects of interests are obtained from the web server 112 via the Internet 116. In some examples, the images 108 are uploaded from the external and/or internal memory of the camera 110 to the image storage 502 and/or the object storage 510. Also, in the illustrated example, the object locator 118 includes the object storage 510 to store images of objects of interests, for example, the product 102 and/or the object 202. In some examples, the image storage 502 and the object storage 510 are combined into a single storage. In the illustrated example, the object locator 118 is provided with the image retriever 504 to retrieve at least one of the search area 402 or the image of the object 202 from the image storage 502 and/or the object storage 510.

To detect the edges 204 of the object 202 and/or the edges 406 of the search area 402, the object locator 118 is provided with the edge detector 506. In the illustrated example, the edge detector 506 detects the edges 406 of the search area 402 and/or the edges 204 of the object 202 using edge detection techniques, such as Canny edge detection, differential edge detection, sobel edge detection, etc. In the illustrated example, the edge detector 506 generates the binary representation 206 of the object 202 and the binary representation 404 of the search area 402.

To determine a score for the object 202 in the search area 402, the object locator 118 is provided with the distance calculator 508 and the image scorer 516. In the illustrated example, the score represents how well the binary representation 206 of the object 202 matches to the binary representation 404 of the search area 402, or more generally, how well the object 202 matches to the search area 402 at a location of the search area 402. For example, a lower score indicates a better match between the object 202 and the search area 402 at a location of the search area 402. Likewise, a higher score indicates a lesser match between the object 202 and the search area 402 at a location of the search area 402.

In the illustrated example, the distance calculator 508 calculates a chamfer distance between the edges 204 of the object 202 and the edges 406 of the search area 402. In the illustrated example, the image scorer 516 calculates a score based on the chamfer distance determined by the distance calculator 508.

In some examples, the image scorer 516 generates a cost matrix by determining a score for the object 202 for locations in the search area 402. In some examples, the image scorer 516 determines a score for every location in the search area 402. A cost matrix includes a score for each location of the search area 402. In some examples, the score at a location is minimized when the object 202 matches the search area 402 at the location of the search area 402. In some examples, the object 202 is detected in the search area 402 when the score is minimized and satisfies a threshold score. In areas of clutter 120, the search area 402 includes a large number of edges 406 causing the chamfer distance between the edges 204 of the binary representation 206 of the object 202 and the edges 406 of the binary representation 404 of the search area 402 to be minimized. Minimizing the score in areas of clutter 120 may cause the object locator 118 to detect the object 202 in the search area 402 incorrectly.

In the illustrated example, the image scorer 516 also determines a second score for the matrix of ones 302 against the search area 402 in a similar manner as described for determining the score for the object 202. In the illustrated example, the object locator 118 is provided with the matrix generator 518 to generate the matrix of ones 302. In the illustrated example, the second score represents how a random object would score against the search area 402 and/or how the random object would be detected in the search area 402. In the illustrated example, the distance calculator 508 cross-correlates the matrix of ones 302 with the edges 412 of the binary representation 404, or more generally, the search area 402. In some examples, the image scorer 516 generates a second cost matrix by determining the second score for the matrix of ones 302 at all locations in the search area 402. The second score of the matrix of ones 302 against the search area 402 represents a maximum possible score for the object 202 against the search area 402. The maximum possible score corresponds to a least likely match between an object and the edges 412 of the search area 402.

To mitigate the effect of the area of clutter 120 on detection of the object 202, the object locator 118 is provided with the normalizer 512. In the illustrated example, the normalizer 512 generates a normalized score by normalizing the score for the object 202 based on the second score calculated with the matrix of ones 302. In some examples, the normalizer 512 generates a normalized cost matrix of normalized scores for the search area 402 by determining the normalized score for each location of the search area 402. The normalized cost matrix has lower false detection rates than the cost matrix for the object 202 alone. In the illustrated example, the normalized score for the locations of the search area 402 containing the object 202 is small to indicate presence of the object 202. In the illustrated example, to indicate an incorrect match between the object 202 and the search area 402, the normalized score is larger in the area of clutter 120 than the normalized score for locations in the search area 402 containing the object 202. Also in the illustrated example, to indicate an absence of the object 202, the normalized score is larger in locations of the search area 402 in which the object 202 is not present than the normalized score for locations in the search area 402 containing the object 202.

In the illustrated example, the object locator 118 is provided with the object detector 514 to analyze the normalized cost matrix to detect and/or count objects 202 in the search area 402. In the illustrated example, the object detector 514 detects the object 202 at a location in the search area 402 when the normalized score for the location in the search area edge 402 satisfies a threshold score. In the illustrated example, the object locator 118 receives the threshold score for detecting the object 202. In some examples, a user defines the threshold score that indicates the presence of the object 202.

While an example manner of implementing the object locator 118 of FIG. 1 is illustrated in FIG. 5, one or more of the elements, processes and/or devices illustrated in FIG. 5 may be combined, divided, re-arranged, omitted, eliminated and/or implemented in any other way. Further, the example image storage 502, the example object storage 510, the example image retriever 504, the example normalizer 512, the example edge detector 506, the example object detector 514, the example distance calculator 508, the example image scorer 516, the example matrix generator 518, and/or, more generally, the example object locator 118 of FIG. 1 may be implemented by hardware, software, firmware and/or any combination of hardware, software and/or firmware. Thus, for example, any of the example image storage 502, the example object storage 510, the example image retriever 504, the example normalizer 512, the example edge detector 506, the example object detector 514, the example distance calculator 508, the example image scorer 516, the example matrix generator 518, and/or, more generally, the example object locator 118 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, image storage 502, the example object storage 510, the example image retriever 504, the example normalizer 512, the example edge detector 506, the example object detector 514, the example distance calculator 508, the example image scorer 516, the example matrix generator 518, and/or more generally, the object locator 118 is/are hereby expressly defined to include a tangible computer readable storage device or storage disk such as a memory, a digital versatile disk (DVD), a compact disk (CD), a Blu-ray disk, etc. storing the software and/or firmware. Further still, the example object locator 118 of FIG. 1 may include one or more elements, processes and/or devices in addition to, or instead of, those illustrated in FIG. 5, and/or may include more than one of any or all of the illustrated elements, processes and devices.

Figure 6:
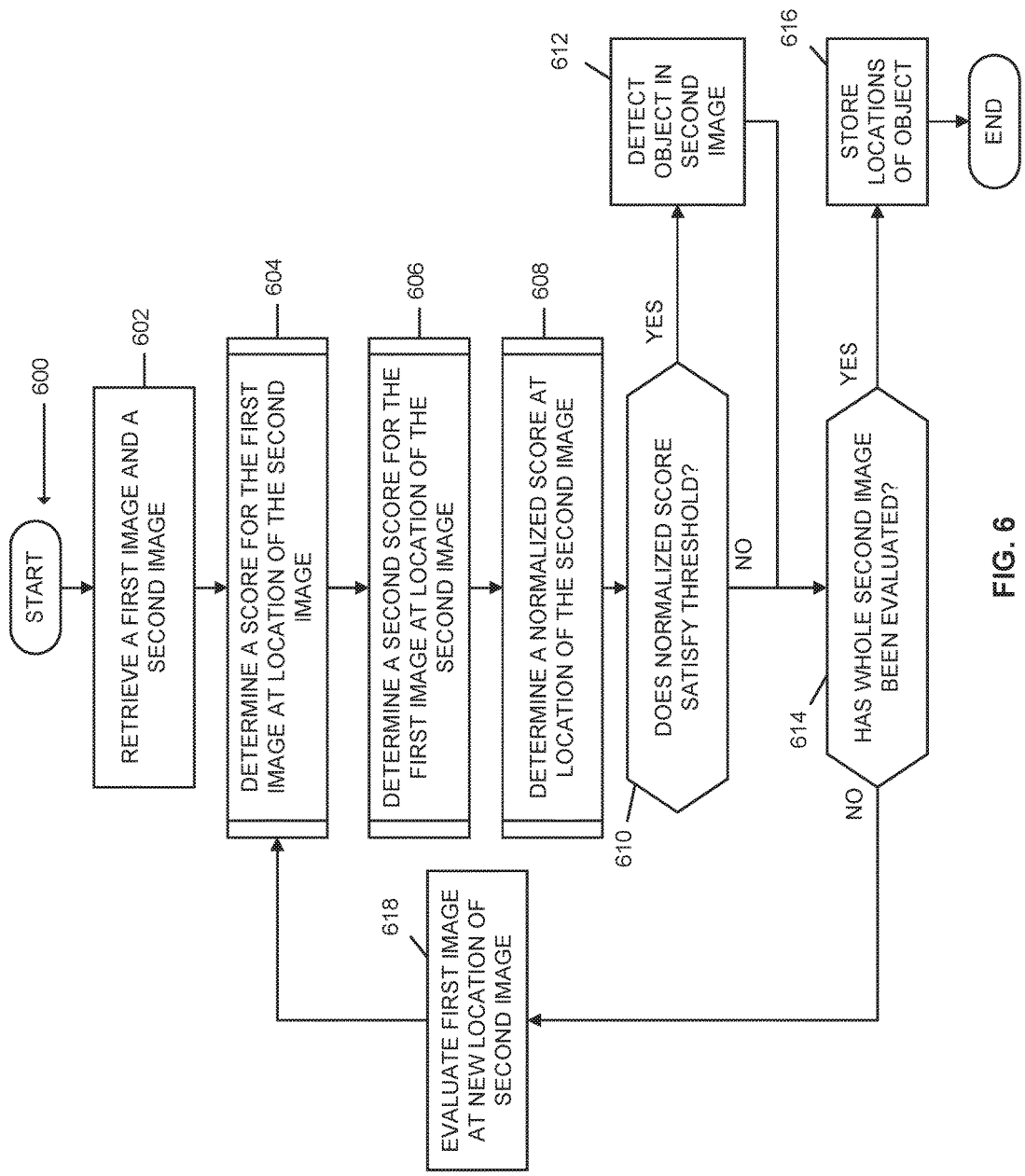
FIG. 6 is a flowchart representative of example machine readable instructions to implement the example object locator of FIG. 5 to locate the example object represented in FIG. 2 in the example search area of FIG. 4.
Figure 7:
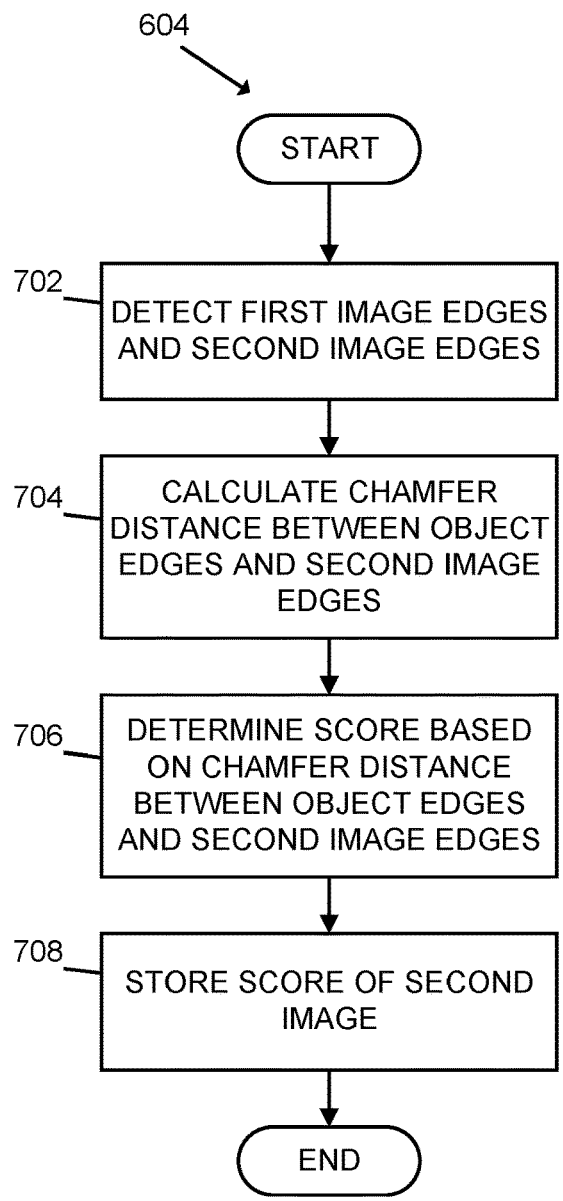
FIG. 7 is a flowchart representative of example machine readable instructions determine a score corresponding to the example object represented in FIG. 2 using the example object locator of FIG. 5.
Figure 8:
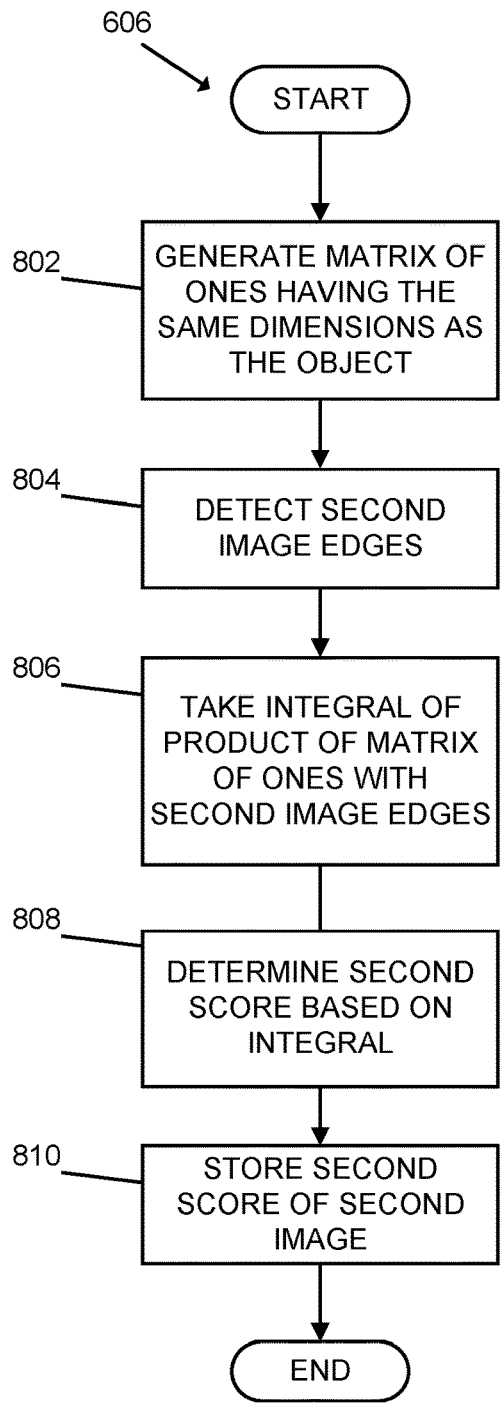
FIG. 8 is a flowchart representative of example machine readable instructions to determine a second score of the example object represented in FIG. 3 using the example object locator of FIG. 5.
Figure 9:
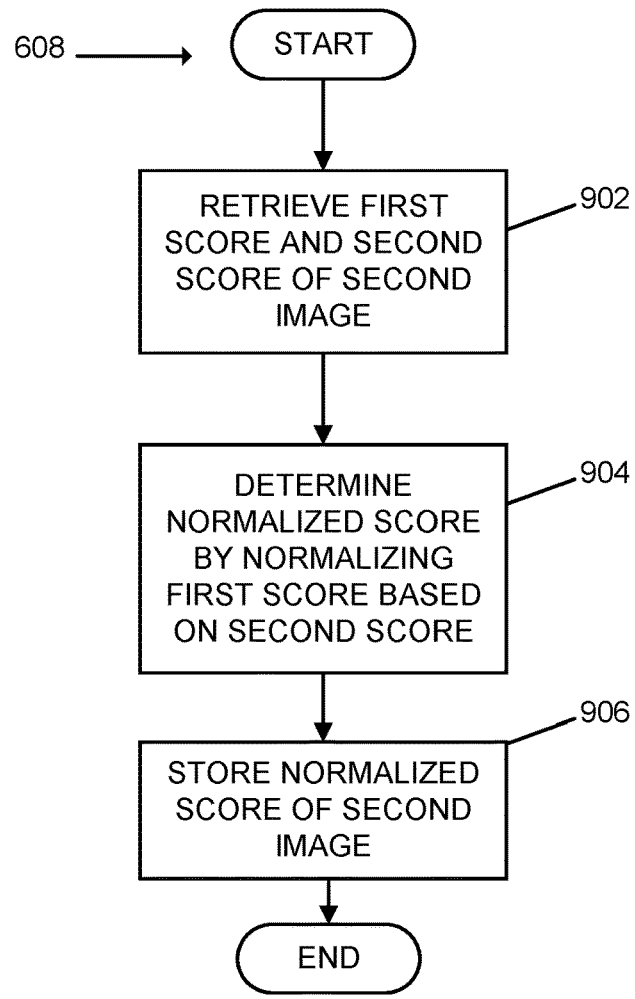
FIG. 9 is a flowchart representative of example machine readable instructions to determine a normalized score of the example object represented in FIG. 2 using the example object locator of FIG. 5.

Flowcharts representative of example machine readable instructions for implementing the object locator 118 of FIGS. 1 and 5 are shown in FIGS. 6, 7, 8, and 9. FIG. 6 is a flowchart representative of machine readable instructions that when executed, may be used to implement the object locator 118 of FIGS. 1 and 5 to locate the object 202 in images 108. FIG. 7 is a flowchart representative of machine readable instructions that when executed, may be used to implement the object locator 118 of FIGS. 1 and 5 to determine a score for the object 202. FIG. 8 is a flowchart representative of machine readable instructions that when executed, may be used to implement the object locator 118 of FIGS. 1 and 5 to determine a second score for the matrix of ones 302. FIG. 9 is a flowchart representative of machine readable instructions that when executed, may be used to implement the object locator 118 of FIGS. 1 and 5 to determine a normalized score for the object 202. In the examples of FIGS. 6, 7, 8, and 9, the machine readable instructions may be used to implement programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire programs and/or parts thereof could alternatively be executed by a device other than the processor 1012 and/or embodied in firmware or dedicated hardware. Further, although the example programs are described with reference to the flowcharts illustrated in FIGS. 6, 7, 8, and 9, many other methods of implementing the example object locator 118 may alternatively be used. For example, the order of execution of the blocks may be changed, and/or some of the blocks described may be changed, eliminated, or combined.

As mentioned above, the example processes of FIGS. 6, 7, 8, and 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6, 7, 8, and 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning now to the illustrated example of FIG. 6, the image retriever 504 retrieves a first image and a second image (block 602). In the illustrated example, the first image is an image 108 of the object 202 and the second image is an image 108 of the search area 402. In the illustrated example, the image retriever 504 retrieves the first image and the second image from at least one of the image storage 502 and/or the object storage 510. In the illustrated example, the image scorer 516 determines a score for the first image at a location of the second image (block 604). Determining a score for the first image and the second image includes detecting edges of each image and determining distances between the edges of each image. Details of determining the score for the first image and the second image are discussed below in relation to FIG. 7.

In the illustrated example of FIG. 6, the image scorer 516 also determines a second score for the first image at a location of the second image (block 606). Determining a second score for the first image and the second image includes generating a matrix of ones, detecting edges of the second image, and determining the integral of the product of the matrix of ones 302 and the second image. Details of determining the second score for the second image are discussed below in relation to FIG. 8.

In the illustrated example of FIG. 6, the normalizer 512 determines a normalized score at a location the second image (block 608). Determining a normalized score includes normalizing the first score by the second score. Further details of determining the normalized score are discussed below in relation to FIG. 9.

In the illustrated example of FIG. 6, the object detector 514 compares the normalized score to a threshold score (block 610). If the normalized score satisfies the threshold score, the object detector 514 detects the object 202 in the second image at the location of the second image (block 612). If the normalized score does not satisfy the threshold score, the object locator 118 determines whether the whole second image has been evaluated (block 614). If the whole second image has not been evaluated, the object locator 118 evaluates the first image at a new location of the second image (block 618). Control then returns to block 604 to determine a score for the first image and the second image. If the whole second image has been evaluated, the locations of the object 202 in the second image are stored (block 616) and the process 600 ends.

In the illustrated example of FIG. 7 the edge detector 506 detects first image edges and second image edges (block 702). In the illustrated example, the edge detector 506 detects edges 204 of the object 202 and the edges 406 of the search area 402 using an edge detection technique. In some examples, the example edge detector 506 may generate the binary representation 206 of the object 202 and the binary representation 404 of the search area 402. In the illustrated example, the distance calculator 508 calculates a chamfer distance between the object 202 edges 204 and the search area 402 edges 406 (block 704). The example distance calculator 508 calculates the chamfer distance using the edges 212, and 412 of the respective object 202 and search area 402. In the illustrated example, the image scorer 516 determines a score based on the calculated chamfer distance (block 706). In the illustrated example, the score of the second image is then stored (block 708) and the process 700 ends.

In the illustrated example of FIG. 8, the matrix generator 518 generates a matrix of ones 302 having the same dimensions as the object 202 of FIG. 2 (block 802). In the illustrated example, the edge detector 506 then detects edges of the second image (block 804). In the illustrated example, the distance calculator 508 takes the integral of the product of the matrix of ones 302 and the edges 412 of the search areas 402 (block 806). In the illustrated example, the integral of the product of the matrix of ones 302 and the edges 412 of the search areas 402 compensates for background shapes besides the object 202. In the illustrated example, the image scorer 516 determines a second score at block 808 based on the integral of the product of the matrix of ones 302 and the edges 412 of the search areas 402 (block 808). In the illustrated example, the second score of the second image is then stored (block 810) and the process 800 ends.

In the illustrated example of FIG. 9, the normalizer 512 retrieves the score determined in process 700 of FIG. 7 and the second score determined in process 800 of FIG. 8. In the illustrated example, the normalizer 512 determines a normalized score by normalizing the first score based on the second score (block 904). In the illustrated example, the normalized score is defined as the ratio of the first score to the second score. The normalized score mitigates the effects of background shapes and the area of clutter 120. In the illustrated example, the normalized score of the second image is then stored (block 906) and the process 900 ends.

Figure 10:
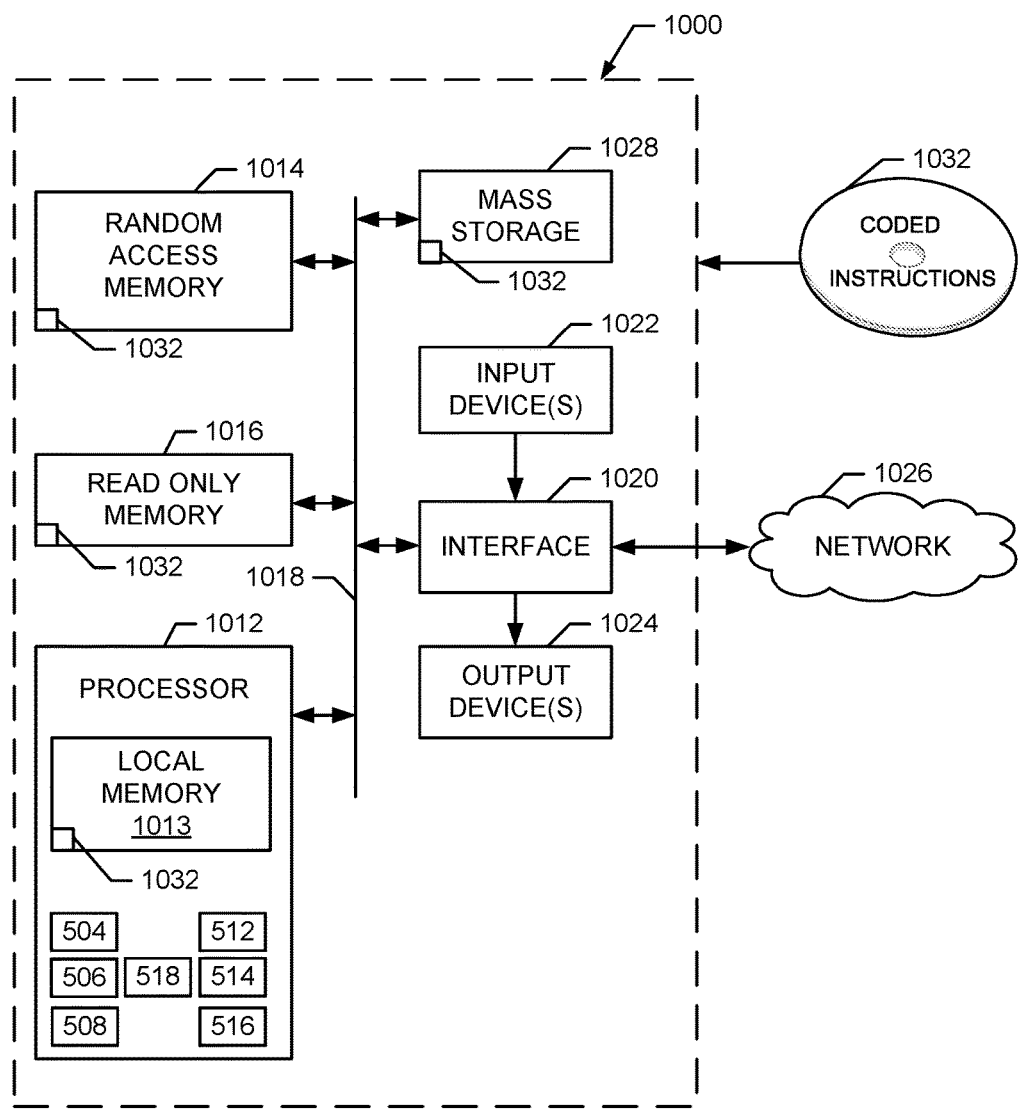
FIG. 10 is a block diagram of an example processor platform that may be used to execute the instructions of FIGS. 6, 7, 8, and/or 9 to implement the example object locator of FIGS. 1 and 5 and/or, more generally, the example system of FIG. 1.

FIG. 10 is a block diagram of an example processor platform 1000 capable of executing the instructions of FIGS. 6, 7, 8, and/or 9 to implement the object locator 118 of FIGS. 1 and 5. The processor platform 1000 can be, for example, a server, a personal computer, a mobile device (e.g., a cell phone, a smart phone, a tablet such as an iPad™), a personal digital assistant (PDA), an Internet appliance, a digital video recorder, a personal video recorder, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor 1012 of the illustrated example includes the example image retriever 504, the example edge detector 506, the example distance calculator 508, the example normalizer 512, the example object detector 514, the example image scorer 516, and the example matrix generator 518 of FIG. 5. In some examples, any combination of the blocks of the object locator 118 may be implemented in the processor and/or more generally, the processor platform 600.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 6, 7, 8, and/or 9 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture are advantageous in improving object detection in images. The probability that an arbitrarily shaped object would be declared a match is accounted for by normalizing the cost matrix used for detection of an object of interest with a cost matrix for a matrix of ones representing a plurality of shapes. By normalizing the cost matrix by the cost matrix for the matrix of ones, the accuracy and efficiency of object detection results are improved.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to detect an object comprising:
   an image scorer to:
      determine a first score based on a first pixel distance between a first feature of a first object in a reference image and a second feature in a second image of a search area; and
      determine a second score corresponding to a second pixel distance between the second feature and a mathematical representation of a plurality of shapes representing a similarity between the second feature in the second image of the search area and the plurality of shapes observed simultaneously;
   a normalizer to determine a normalized score by normalizing the first score based on the second score; and
   an object detector to identify a second object in the second image of the search area as the first object in the reference image when the normalized score satisfies a threshold score.

2. The apparatus of claim 1, wherein the second score represents a lesser similarity between the second feature and the plurality of shapes observed simultaneously than a second similarity between the second feature and any one of the plurality of shapes.

3. The apparatus of claim 1, wherein the plurality of shapes are representative of background clutter.

4. The apparatus of claim 1, wherein the second feature in the second image includes an edge of a retail store shelf.

5. The apparatus of claim 1, wherein the image scorer is to determine the second score by cross-correlating the second feature with a matrix of ones having a same perimeter as the first object.

6. The apparatus of claim 1, wherein when the normalized score does not satisfy the threshold score:
   the image scorer is further to:
      determine a third score based on a third pixel distance between the first feature of the first object in the reference image and a third feature in the second image of the search area, the third feature at a different location in the second image than the second feature in the second image; and
      determine a fourth score corresponding to a fourth pixel distance between the third feature and a second mathematical representation of a second plurality of shapes representing a similarity between the third feature in the second image of the search area and the second plurality of shapes observed simultaneously;
   the normalizer is further to determine a second normalized score by normalizing the third score based on the fourth score; and
   the object detector is further to identify the second object in the second image of the search area as the first object in the reference image when the second normalized score satisfies the threshold score.

7. A method to detect an object in an image comprising:
   determining, by executing an instruction with a processor, a first score based on a first pixel distance between a first feature of a first object in a reference image and a second feature in a second image of a search area;
   determining, by executing an instruction with the processor, a second score corresponding to a second pixel distance between the second feature and a mathematical representation of a plurality of shapes representing a similarity between the second feature in the second image of the search area and the plurality of shapes observed simultaneously;
   determining, by executing an instruction with the processor, a normalized score by normalizing the first score based on the second score; and
   identifying, by executing an instruction with the processor, a second object in the second image of the search area as the first object in the reference image when the normalized score satisfies a threshold score.

8. The method of claim 7, wherein the second score represents a lesser similarity between the second feature and the plurality of shapes observed simultaneously than a second similarity between the second feature and any one of the plurality of shapes.

9. The method of claim 7, wherein the plurality of shapes are representative of background clutter.

10. The method of claim 7, wherein the second feature in the second image includes an edge of a retail store shelf.

11. The method of claim 7, wherein determining the second score further includes cross-correlating the second feature with a matrix of ones having a same perimeter as the first object.

12. The method of claim 7, further including, when the normalized score does not satisfy the threshold score:
   determining, by executing an instruction with the processor, a third score based on a third pixel distance between the first feature of the first object in the reference image and a third feature in the second image of the search area, the third feature at a different location in the second image than the second feature in the second image;
   determining, by executing an instruction with the processor, a fourth score corresponding to a fourth pixel distance between the third feature and a second mathematical representation of a second plurality of shapes representing a similarity between the third feature in the second image of the search area and the second plurality of shapes observed simultaneously;
   determining, by executing an instruction with the processor, a second normalized score by normalizing the third score based on the fourth score; and
   identifying, by executing an instruction with the processor, the second object in the second image of the search area as the first object in the reference image when the second normalized score satisfies the threshold score.

13. A non-transitory computer readable storage medium comprising instructions, that when executed, cause a processor to at least:
   determine a first score based on a first pixel distance between a first feature of a first object in a reference image and a second feature in a second image of a search area;
   determine a second score corresponding to a second pixel distance between the second feature and a mathematical representation of a plurality of shapes representing a similarity between the second feature in the second image of the search area and the plurality of shapes observed simultaneously;
   determine a normalized score by normalizing the first score based on the second score; and identify a second object in the second image of the search area as the first object in the reference image when the normalized score satisfies a threshold score.

14. The non-transitory computer readable storage medium of claim 13, wherein the second score represents a lesser similarity between the second feature and the plurality of shapes observed simultaneously than a second similarity between the second feature and any one of the plurality of shapes.

15. The non-transitory computer readable storage medium of claim 13, wherein the plurality of shapes are representative of background clutter.

16. The non-transitory computer readable storage medium of claim 13, wherein the second feature in the second image includes an edge of a retail store shelf.

17. The non-transitory computer readable storage medium of claim 13, wherein the instructions are further to cause the processor to determine the second score by cross-correlating the second feature with a matrix of ones having a same perimeter as the first object.

18. The non-transitory computer readable storage medium of claim 13, wherein when the normalized score does not satisfy the threshold score, the instructions are further to cause the processor to:
- determine a third score based on a third pixel distance between the first feature of the first object in the reference image and a third feature in the second image of the search area, the third feature at a different location in the second image than the second feature in the second image;
- determine a fourth score corresponding to a fourth pixel distance between the third feature and a second mathematical representation of a second plurality of shapes representing a similarity between the third feature in the second image of the search area and the second plurality of shapes observed simultaneously;
- determine a second normalized score by normalizing the third score based on the fourth score; and
- identify the second object in the second image of the search area as the first object in the reference image when the second normalized score satisfies the threshold score.

* * * * *